(12) United States Patent
Gartner et al.

(10) Patent No.: US 6,421,681 B1
(45) Date of Patent: Jul. 16, 2002

(54) FRAMEWORK FOR REPRESENTATION AND MANIPULATION OF RECORD ORIENTED DATA

(75) Inventors: Harold J. Gartner, Thornhill; John H. Green, Toronto; Vladimir Klicnik; John W. Stephenson, both of Oshawa, all of (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,142
(22) Filed: May 25, 1999

(30) Foreign Application Priority Data

Sep. 25, 1998 (CA) ................................................ 2248522

(51) Int. Cl.⁷ ............................................... G06F 7/100
(52) U.S. Cl. ...................... 707/103; 707/102; 717/104; 717/108
(58) Field of Search ............................... 717/1, 2, 104, 717/106, 116, 108; 707/103, 103 R, 102, 101; 709/300, 302, 217, 229, 311, 328; 345/763

(56) References Cited

U.S. PATENT DOCUMENTS

| | | | | |
|---|---|---|---|---|
| 5,187,787 A | * | 2/1993 | Skeen et al. ................. | 709/300 |
| 5,475,845 A | * | 12/1995 | Orton et al. ................. | 709/302 |
| 5,504,892 A | * | 4/1996 | Atsatt et al. ................. | 707/103 |
| 5,627,979 A | * | 5/1997 | Chang et al. ................. | 345/763 |
| 5,692,183 A | * | 11/1997 | Hapner et al. ............... | 707/103 |
| 5,790,855 A | * | 8/1998 | Faustini ......................... | 717/1 |
| 5,878,432 A | * | 3/1999 | Misheski et al. ............ | 707/103 |
| 5,915,252 A | * | 6/1999 | Misheski et al. ............ | 707/103 |
| 5,924,101 A | * | 7/1999 | Bach et al. .................. | 707/103 |
| 6,016,495 A | * | 1/2000 | McKeehan et al. ......... | 707/103 |
| 6,018,743 A | * | 1/2000 | Xu .............................. | 707/103 |
| 6,061,505 A | * | 5/2000 | Pitchaikani et al. ... | 395/200.56 |
| 6,061,515 A | * | 5/2000 | Chang et al. ................. | 717/2 |
| 6,125,364 A | * | 9/2000 | Greef et al. ................. | 707/103 |
| 6,141,660 A | * | 10/2000 | Bach et al. .................. | 707/103 |
| 6,173,439 B1 | * | 1/2001 | Carlson et al. .............. | 717/108 |

OTHER PUBLICATIONS

Title: An Event–Object Recovery Model for Object–Oriented User Interface, ACM, author: Wang et al, Nov. 1991.*

* cited by examiner

Primary Examiner—Kakali Chaki
Assistant Examiner—Chameli C. Das
(74) Attorney, Agent, or Firm—Owen J. Gamon; Moser, Patterson & Sheridan, LLP

(57) ABSTRACT

Methods, systems and articles of manufacture comprising a computer usable medium having computer readable program code means therein are directed to a framework for representation and manipulation of record oriented data. Particularly, the framework of the present invention provides access from applications written in a computer programming language, preferably the Java language, to records created by an application written in another programming language by describing and correctly converting record data in such records. In a preferred embodiment, the framework is designed in and for the Java language, has a concrete class implementation written in Java capable of handling C language data types and provides the ability to access stored or sent records, created by an application written in the C language, from applications written in the Java language. The framework also provides a set of mechanisms to be used by record builder tools.

58 Claims, 8 Drawing Sheets

FRAMEWORK FOR REPRESENTATION AND MANIPULATION OF RECORD ORIENTED DATA

FIELD OF THE INVENTION

This invention relates to a framework for representation and manipulation of record oriented data. Particularly, a preferred embodiment of the framework is designed in and for the Java language, has a concrete class implementation written in Java capable of handling C language data types and provides the ability to access stored or sent records, created by an application written in the C language, from applications written in the Java language.

BACKGROUND OF THE INVENTION

The Java™ language has quickly become one of the accepted languages for writing enterprise-level applications. For many companies and other organizations it has in fact become the language of choice for new software applications. This is not only true for web-based software applications running in a browser (such as applets), but exceedingly more so for traditional full-function software applications that include user interface, as well as distribution and server-side resource access.

Nevertheless, the bulk of enterprise data continues to reside either in the traditional database or some record-oriented store (e.g. VSAM on S/390®). This enterprise data is processed by existing line-of-business software applications, the majority of which are written in traditional programming languages such as COBOL and C. While the Java language does provide support for database access (e.g. Java Database Connectivity (JDBC) function), it currently has no effective facility for handling non-database record data.

It is therefore desirable to provide for a framework for representation and manipulation of record oriented data, preferably a framework designed in and for the Java language. As used herein, a record is loosely defined as a logical collection of application data elements or fields, related by some application-level semantic, that is stored and retrieved (or sent and received) in a computer system as a unit (e.g. a contiguous area of bytes). For example, referring to FIG. 1, an Invoice record may be defined by a software application to have the form as shown and stored on a computer usable medium such as a hard drive disk. Particularly, the invoice record of FIG. 1 includes data elements in a contiguous group of bytes (0 to 90) semantically allocated wherein bytes 0 to 10 are allocated to the data element Invoice Number 10 containing data of the integer data type, bytes 11 to 30 are allocated to data element Purchaser Name 20 containing data of the character data type, bytes 31 to 80 are allocated to data element Purchaser Address 30 containing data of the character data type, and bytes 81 to 90 are allocated to data element Amount 40 containing data of the floating point data type. Typically, the record is defined by means of a data structure in an application written in a traditional programming language such as COBOL and the individual data elements can be directly accessed through that application or another application written in the same programming language. Accordingly, the framework of the present invention provides access from applications written in another programming language, preferably the Java language, to such records by describing and correctly converting record data in such records.

The present invention builds upon a similar framework provided as part of the IBM® VisualAge® for Smalltalk product. Some of the similarities between this Smalltalk framework and the framework of the present invention include provision for converting between record bytes and the framework representation of the data only when the corresponding field is accessed (a "lazy fetch" mechanism). Both frameworks also make a distinction between dynamic and custom records, although in the Smalltalk framework, the concept is not apparent to the user, nor does the user have a choice of between using dynamic or custom records. Further, both frameworks provide for the iteration over the fields of a dynamic record.

Nevertheless, the Java framework of the present invention provides a number of improvements and/or distinctions over the Smalltalk framework. The framework of the present invention has an advantage of providing variable length record support, as well as the ability to mix fixed length and variable length records together in one record. The present invention has a further advantage of providing support for overlaid fields. Additionally, the invention advantageously provides distinct typesets which are used by generic fields. In the Smalltalk framework, the field and type were combined together and so instead the distinct typesets of the present invention allow a new typeset to be easily incorporated into the framework for use. Also, the invention advantageously provides for "packing" a record after creating the fields which allows for the dynamic record to be fully editable i.e. a user can add, delete, rename, and/or replace fields of a record. Furthermore, the builder tool support classes of the present invention beneficially allow for graphical user interface (GUI) based editors to manipulate the records.

In sum, it is desirable to provide a method, system and article of manufacture comprising a computer usable medium having computer readable program code means therein for access from applications written in a computer programming language, preferably the Java language, to records created by an application written in another programming language by describing and correctly converting record data in such records.

SUMMARY OF THE INVENTION

Accordingly, the present invention provides new and useful methods, systems and articles of manufacture comprising a computer usable medium having computer readable program code means therein are directed to a framework for representation and manipulation of record oriented data. Particularly, the framework of the present invention provides access from applications written in a computer programming language, preferably the Java language, to records created by an application written in another programming language by describing and correctly converting record data in such records.

The present invention provides a computer-implemented method for accessing a record, said record having a field and record bytes, comprising the steps of (a) modeling the record by means of an implementation of a framework, wherein the framework comprises a record interface, a record type interface, a field interface and a type interface, and (b) accessing the record bytes through said implementation of the framework. The above-method is further provided with a record interface that associates a record type with the record bytes and describes attributes of the record bytes in terms of data encoding characteristics. Additionally, the record interface may comprise a dynamic record interface, said dynamic record interface providing an accessor to the field in accordance with an identifier of the field. The record interface may also comprise a custom record interface, said custom record interface providing a user-defined accessor to the record bytes. The user may also selectively choose implementation of the dynamic record interface or the custom record interface.

The above-method may also have a record type interface that collects a field descriptor of the field in the record. The record type interface may further comprise a dynamic record type interface, said dynamic record type interface providing the ability to add, insert, delete, or retrieve field descriptors. The dynamic record type interface may also provide the ability to iterate over field descriptors of the record through an enumerator. Additionally, the record type interface may provide the capability to define new records of the record type.

The above-method may also have a field interface that associates a field descriptor with the field of the record, said field descriptor comprising a field name, a data type, and a field relative offset into the record bytes. The field interface can provide an accessor to the field in accordance with an absolute offset with respect to the record in terms of record bytes. Further, the field interface may comprise a nested record field interface, said nested record interface defining a structure of records within the record. The field interface may also comprise an overlay field interface, said overlay field interface defining a union of fields anchored to a same offset within the record bytes.

The above-method may be provided with a type interface that defines a data type of the field. The data type may be configurable and supplied by the user. Further, the type interface may comprise a static conversion method and an accessor to the record bytes of the field. The type interface may also comprise a fixed length type interface, said fixed length type interface providing an accessor to the record bytes in accordance with a fixed offset of the field. The type interface may also comprise a variable length type interface, said variable length type interface providing an accessor to (a) read the record bytes of the record and unpack the record bytes into segments corresponding to the fields of the record; (b) store said segments in a field level cache for access; and (c) pack the segments back into a contiguous array of record bytes of the record and write the contiguous array of record bytes of the record. Providing an accessor to unpack the record bytes may further comprise providing a method that returns record data of the field without the record data that delimits the field in the record and providing an accessor to pack the record bytes may comprise providing a method that attaches delimiting record data to the record data of a field according to the data type of the field.

The above-method is also provided such that the step of accessing the record bytes comprises converting the record bytes of a field into a framework representation only when said field in the record is accessed. Further, the above-method is provided such the interfaces may be extended by a user to define additional interfaces.

The above-method may be implemented by means of an object-oriented computer programming language, particularly Java, C++ or SmallTalk. Also, the record in the above-method may have specific computer programming language record data characteristics, particularly characteristics attributable to COBOL, C or PL1. The record in the above-method may also have a record identifier, said record identifier comprising the record bytes and record attributes of the record.

The above-method is also provided such that the step of accessing the record bytes comprises optionally providing access to the record data in hierarchical form or flat form Providing access to the record data in hierarchical form may comprise generating classes according to a hierarchical field structure of the record, each class comprising an accessor for the fields in the structure. Providing access to the record data in flat form may comprise generating a single class for a field structure of the record, said class comprising an accessor for the fields in the structure. Providing access to the record data, the record containing an array of subrecords, may comprise generating a class for a subrecord, said class comprising an accessor for the fields of the subrecord.

There is also provided an article of manufacture comprising a computer usable medium having computer readable program code means therein for performing the above-method and its variations.

The present invention also provides a computer system for accessing a record, said record having a field and record bytes, comprising the record stored on a data storage device connected to a computer; and the computer comprising code means, executed by the computer, for retrieving record data from the record, code means for modeling the record by means of an implementation of a framework, wherein the framework comprises a record interface, a record type interface, a field interface and a type interface, and code means for accessing record data of the record through said implementation of the framework. The above-system is also provided with a record interface associates a record type with the record bytes. The record interface may further describe attributes of the record bytes in terms of data encoding characteristics. The record interface may also comprise a dynamic record interface, said dynamic record interface providing an accessor to the field in accordance with an identifier of the field. The record interface may also further comprise a custom record interface, said custom record interface providing a user-defined accessor to the record bytes. The user may also selectively choose implementation of the dynamic record interface or the custom record interface.

The above-system may also have a record type interface that collects a field descriptor of the field in the record. The record type interface may further comprise a dynamic record type interface, said dynamic record type interface providing the ability to add, insert, delete, or retrieve field descriptors. The dynamic record type interface may also provide the ability to iterate over field descriptors of the record through an enumerator. Additionally, the record type interface may provide the capability to define new records of the record type.

The above-system may also have a field interface that associates a field descriptor with the field of the record, said field descriptor comprising a field name, a data type, and a field relative offset into the record bytes. The field interface can provide an accessor to the field in accordance with an absolute offset with respect to the record in terms of record bytes. Further, the field interface may comprise a nested record field interface, said nested record interface defining a structure of records within the record. The field interface may also comprise an overlay field interface, said overlay field interface defining a union of fields anchored to a same offset within the record bytes.

The above-system may be provided with a type interface that defines a data type of the field. The code means for the data type may be configurable and supplied by the user. Further, the type interface may comprise a static conversion method and an accessor to the record bytes of the field. The type interface may also comprise a fixed length type interface, said fixed length type interface providing an accessor to the record bytes in accordance with a fixed offset of the field. The type interface may also comprise a variable length type interface, said variable length type interface providing an accessor to (a) read the record bytes of the record and unpack the record bytes into segments corresponding to the fields of the record; (b) store said segments in a field level cache for access; and (c) pack the segments back into a contiguous array of record bytes of the record and write the contiguous array of record bytes of the record. Providing an accessor to unpack the record bytes may further comprise providing a method that returns record data of the field without the record data that delimits the field in the record and providing an accessor to pack the record bytes may comprise providing a method that attaches delimiting record data to the record data of a field according to the data type of the field.

The above-system is also provided such that the code means for accessing the record bytes comprises converting the record bytes of a field into a framework representation only when said field in the record is accessed. Further, the above-system is provided such the interfaces may be extended by a user to define additional interfaces.

The above-system may be implemented by means of an object-oriented computer programming language, particularly Java, C++ or SmallTalk. Also, the record in the above-system may have specific computer programming language record data characteristics, particularly characteristics attributable to COBOL, C or PL1. The record in the above-system may also have a record identifier, said record identifier comprising the record bytes and record attributes of the record.

The above-system is also provided such that the code means for accessing the record bytes comprises optionally providing access to the record data in hierarchical form or flat form. The code means for providing access to the record data in hierarchical form may comprise generating classes according to a hierarchical field structure of the record, each class comprising an accessor for the fields in the structure. The code means for providing access to the record data in flat form may comprise generating a single class for a field structure of the record, said class comprising an accessor for the fields in the structure. The code means for providing access to the record data, the record containing an array of subrecords, may comprise generating a class for a subrecord, said class comprising an accessor for the fields of the subrecord.

The present invention also provides an object-oriented framework for use in a computer system that supports an object-oriented programming environment, wherein the framework provides access to a record in said computer system said record having a field and record bytes, and includes: a record class, said record class associating a record type with the record bytes; a record type class, said record type class collecting a field descriptor of the field in the record; a field class, said field class associating the field descriptor with the field of the record, said field descriptor comprising a field identifier, a data type, and a field relative offset into the record bytes; and a type class, said type class defining the data type of the field. The above-framework may provide that the record class further describes attributes of the record bytes in terms of data encoding characteristics. The record class may also comprise a dynamic record class, said dynamic record class providing an accessor to the field in accordance with an identifier of the field. The record class may also comprise a custom record class, said custom record class providing a user-defined accessor to the record bytes. The user may also selectively choose implementation of the dynamic record class or the custom record class.

The above-framework may also be provided such that the record type class comprises a dynamic record type class, said dynamic record type class providing the ability to add, insert, delete, or retrieve field descriptors. The dynamic record type class may also provide the ability to iterate over field descriptors of the record through an enumerator. The record type class may also provide the capability to define new records of the record type.

The above-framework may also have the field class provide an accessor to the field in accordance with an absolute offset with respect to the record in terms of record bytes. Further, the field class may comprise a nested record field class, said nested record class defining a structure of records within the record. The field class can also comprise an overlay field class, said overlay field class defining a union of fields anchored to a same offset within the record bytes.

The above-framework may also be provided such that the data type may be configurable and supplied by the user. Further, the type class may comprise a static conversion method and an accessor to the record bytes of the field. The type class may also comprise a fixed length type class, said fixed length type class providing an accessor to the record bytes in accordance with a fixed offset of the field. The type class may also comprise a variable length type class, said variable length type class providing an accessor to: (a) read the record bytes of the record and unpack the record bytes into segments corresponding to the fields of the record; (b) store said segments in a field level cache for access; and (c) pack the segments back into a contiguous array of record bytes of the record and write the contiguous array of record bytes of the record. Providing an accessor to unpack the record bytes further may comprise providing a method that returns record data of the field without the record data that delimits the field in the record and providing an accessor to pack the record bytes further comprises providing a method that attaches delimiting record data to the record data of a field according to the data type of the field.

The above-framework may be provided such that the classes may be extended by a user to define additional classes. Further, the classes may be implemented by means of an object-oriented computer programming language, particularly Java, C++ or SmallTalk. Also, the record in the above-framework may have specific computer programming language record data characteristics, particularly characteristics attributable to COBOL, C or PL1. The record in the above-framework may also have a record identifier, said record identifier comprising the record bytes and record attributes of the record.

The present invention also provides a method of operating a computer system that provides an object-oriented programming environment, having one or more records, and communicating with one or more users executing object-oriented application programs for access to the record, the method comprising the steps of: (a) modeling the record in accordance with an object-oriented framework comprising: (i) a record class, said record class associating a record type with the record bytes; (ii) a record type class, said record type class collecting a field descriptor of the field in the record; (iii) a field class, said field class associating the field descriptor with the field of the record, said field descriptor comprising a field identifier, a data type, and a field relative offset into the record bytes; and (iv) a type class, said type class defining the data type of the field; and (b) accessing the record bytes through said framework. The above-method may be implemented by means of an object-oriented computer programming language, particularly Java, C++ or SmallTalk. Also, the record class may comprise a dynamic record class, said dynamic record class providing an accessor to the field in accordance with an identifier of the field. The record class may also comprise a custom record class, said custom record class providing a user-defined accessor to the record bytes. The user may also selectively choose implementation of the dynamic record class or the custom record class.

The above-method may also be provided such that the data type may be configurable and supplied by the user. Further, the type class may comprise a fixed length type class, said fixed length type class providing an accessor to the record bytes in accordance with a fixed offset of the field. Also, the type class may also comprise a variable length type class, said variable length type class providing an accessor to: (a) read the record bytes of the record and unpack the record bytes into segments corresponding to the fields of the record; (b) store said segments in a field level cache for access; and (c) pack the segments back into a contiguous array of record bytes of the record and write the contiguous array of record bytes of the record.

The framework of the present invention addresses flexibility and speed of access. Record access requires the ability to define the data element content of each record. This requires a flexible descriptor structure capable of expressing the record construction semantics used by the various target environments containing the record. Further, a user needs the ability to create such record descriptors on-the-fly or dynamically as part of an application, as well as the ability to predefine these as separate classes. In addition, in the case of existing applications, the record formats are well known ahead of tire, and do not frequently change (if at all). Consequently, it is desirable to be able to provide optimized run-time accessors (a combination of read/write methods or in Java, get/set methods) that bypass the overhead of lookup structures as an alternative to dynamic descriptors.

Since in general, records can have fixed or variable length, the framework of the present invention advantageously is able to manipulate records which are fixed or variable length in nature, or a mixture of the two.

Furthermore, most of today's record data has been written by applications written in traditional computer programming languages such as COBOL instead of applications written in modern computer programming languages such as Java and C++. Consequently, record access from such modern languages such as Java must be able to handle data conversions required by cross-language access. In addition, many of the users of the record support may provide cross-system access e.g. remote record file input/output which also requires conversion of record data.

Most existing record-oriented applications have not been designed with modem programming language application, such as Java applications, in mind. As a result, it is quite likely that only a small portion of a retrieved record may end up being used by a modem language application. Since unnecessary data conversions of large structures are expensive, the framework advantageously should delay any data conversions until required—the "lazy fetch" mechanism as described above.

The framework of the present invention also has an advantage of allowing the user to target different environments. By providing different data type converters and allowing new data type converters to be added, a user can access record data on different environments.

The framework also advantageously provides, in a preferred embodiment, direct support of Java types. Accessors that manipulate base Java language types should return/take as argument the base type, rather than its object counterpart (e.g. int, rather than Integer). This objective is partly driven by programmer-user convenience, and partly by performance.

Although the primary intent of the framework is to supply a runtime implementation of record-oriented data handling, a set of builder-type tools could be provided in order to assist in construction of record oriented structures. The framework therefore needs to be able to provide design-time information in dealing with its base constructs within a builder tool Lastly, it is an advantage of the present invention to provide usability gains and convenience to a user by allowing access to record field data by name. Any data conversion required on the data is handled when a user invokes the appropriate accessors. The user does not need to understand the format of the data, only the name of field in the record that is of interest. It is a further advantage of the present invention to provide usability and performance gains by providing for selective generation of code, representing a record, in flat or hierarchical form.

BRIEF DESCRIPTION OF THE DRAWINGS

The present invention is illustrated by way of example and not limitation in the figures of the accompanying drawings in which like references indicate similar or corresponding elements and in which.

DETAILED DESCRIPTION OF THE INVENTION

Figure 1:
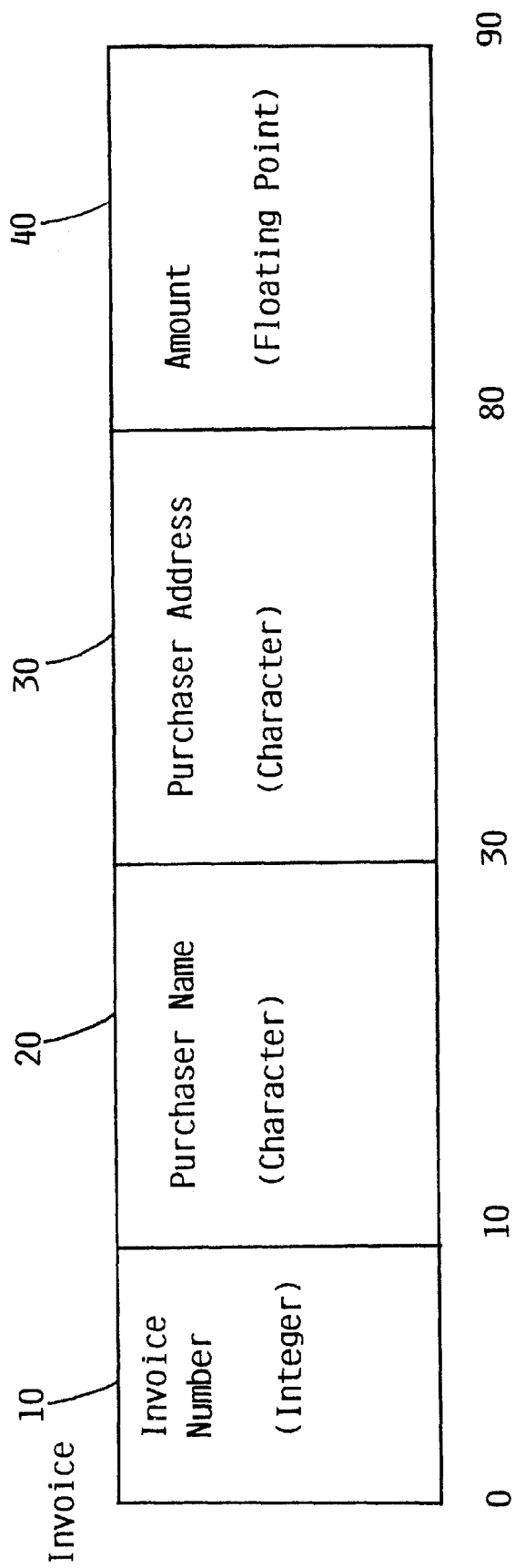
FIG. 1 is a diagram of a sample Invoice record.

This invention relates to a framework for representation and manipulation of record oriented data. Particularly, the framework of the present invention provides access from applications written in a computer programming language, preferably the Java language, to records created by an application written in another programming language by describing and correctly converting record data in such records. In a preferred embodiment, the framework is designed in and for the Java language, has a concrete class implementation written in Java capable of handling C language data types and provides the ability to access stored or sent records, created by an application written in the C language, from applications written in the Java language. While the primary intent of the record oriented framework is to provide runtime support for accessing application record data, the framework also defines a set of mechanisms to be used by record builder tools.

In practice, the concrete class implementations of the framework provide access to record-oriented data by providing for the deletion, addition, modification, insertion, and retrieval of data in a record. Access as used herein includes deleting, modifying, inserting, or retrieving record data of a record.

Further, the framework is usage-context independent. Its intended use is as the base for record oriented file input/output, as well as record-based message passing schemes. The support is equally applicable for use in new applications requiring record services, as well as applications accessing existing record structures. The class implementations may be incorporated, for example, into stand-alone applications that solely provide access to record data (see Builder Tools below for a description of such an embodiment) or provide record data access with other functionality, into an existing application to provide access to record data, or into an application development environment in order to provide record access capability to applications. Consequently, any specific usage context for the records is not important to this invention and is not described.

The framework of the present invention comprises several fundamental elements, mechanisms and concepts. It includes four base construction elements in defining a record, namely the record, record type, field and type and two separate mechanisms for record data access, namely dynamic records and custom records. Additionally, the framework addresses the familiar concepts of alignment, packing and the distinction between fixed length and variable length records.

Record, Record Type, Field and Type

The framework uses four base construction elements in defining a record, namely the record, record type, field and type. Each plays a specific role within the overall structure.

Record

The record is the top level construct that combines the actual record bytes together with its record type. In addition, it carries information describing the attributes or "environment" that originated the bytes e.g. whether string encoding was used, "endianess" of integers, and floating point representation. For programming convenience, specific record fields can be directly accessed through the record construct.

Record Type

The record type is a collection of field descriptors that define the type of the record. It includes information regarding the layout of the record and ordering of the fields. It also acts as a factory or generator for records of the given record type.

It is often convenient to treat a record as a series of nested subrecords. This involves building up a composite record type descriptor. The framework of the present invention supports this concept, with no restriction on the number of nesting levels. This concept is analogous to the support of structures in high level programming languages. Field values in nested records can be accessed directly by specifying a composite field name consisting of all the naming tokens for the nesting levels and the field itself. Such a "path" name is specified in the record accessors (a combination of read/write methods or in Java, get/set methods) as, for example, a String[ ] argument. Additionally, the nested records can also be retrieved and set in their entirety as a single field. In this case the corresponding field value is expressed as a record. Preferably, on retrieval, a record is returned (as Object) with a copy of the nested record bytes. On save, a record is supplied (as Object) and its bytes are copied into the nested record.

Field

The field is simply a combination of its string name, relative offset into the record bytes, and a specification of the underlying data type.

The framework also supports array fields with an arbitrary number of dimensions. Individual array elements can be accessed directly by the base field accessors (using variations of the base accessor methods that take an index argument). Array fields can also be accessed in their entirety. In this case their value is expressed as an array (with an appropriate dimension) of the underlying type (cast as Object in the accessors).

The framework further supports field "overlays" by defining a "union" of data fields, all anchored to the same offset within the record bytes (subject to individual component subfield alignment). The length of an overlaid field is the length of its largest component subfield (again, subject to any subfield alignment).

Type

The type represents the data type of a field used in the record. This is the actual "workhorse" of the framework. In the framework, this is an abstract definition of a type-converter. In running applications, there would be a concrete implementation corresponding to each of the data types being used in the application records. Preferably, type converters retrieve and set values in terms of the base Java data types, java.lang.String, and java.lang.Object.

Optionally, additional base types may be implemented by the user for handling access to application data within a specified target environment whether, for example, the required base type is not supplied by an implementation of the framework or there is no implementation of the framework for the specified target environment. Further, a user may define nested record type classes. This scenario involves deriving a record type class, preferably sharable by others, and building up its field content in the class constructor. Developers can then use this class as the type for nested record fields in their applications.

Dynamic and Custom Records

Two separate mechanisms for record data access are provided as part of the framework. The first mechanism—the dynamic record—is an implementation of a dynamic descriptor structure. It allows a record to be defined as a collection of separate data fields, with descriptive field level information being captured as part of a run-time access structure. Accordingly, a dynamic record's record type is an explicit collection of field descriptors that define the type.

Any record can be accessed using a dynamic description. The access uses a symbolic field name, performs run-time field lookup and invokes the appropriate element accessor. Preferably, dynamic records allow field values to be retrieved and set either in terms of one of the base Java data types (char, byte, short, int, long, float, double), as java.lang.String, or as java.lang.Object. The value accessor methods may take the form:

Object getObject(String name)

void setObject(String name, Object value)

Because of the additional run-time overhead, this mechanism is particularly suitable for access to records whose format is not known ahead of time e.g. the format of the record is not known at design time or the record is of variable length.

The second mechanism—the custom record—is intended for optimized access to records whose format is known ahead of time and does not change and thus is particularly suitable for accessing existing line-of-business data with known and stable definitions. Instead of a dynamic record descriptor, the custom record makes direct references to fields based on their field offsets relative to the record. The value accessor methods may take the form:

Person getPerson( )

void setPerson(Person person)

The accessor method argument and return types are up to the developer of the custom method. The explicit field descriptors are thus actually "compiled" into the custom accessor methods of the custom record class.

It should be noted from this description that a variable length record can only take the form of a dynamic record, as its format is not known ahead of time. Although quite different in their usage and implementation, both styles of records can implement a common set of record handling interfaces. Consequently, either record style could be used in higher-level frameworks based on the record support (for example, record file input/output).

Field Alignment and Packing

Record structures typically support the concepts of alignment and packing. In compiled languages such as COBOL, alignment and packing of records determine the tradeoff between speed of access to record elements and required storage for the data record. In unpacked record structures, the fields are usually aligned on storage boundaries that allow the underlying machine architecture access to the field data with minimum effort (in terms of machine instructions executed). For example, int fields will typically be aligned on a four byte boundary in many machines implementations. Unfortunately, the "cost" of alignment is the addition of padding bytes to compensate for the individual field alignment requirements. If storage usage is a dominant concern, the language compilers typically support various packing algorithms. For example, a "fully" packed record structure forces byte alignments on all of its contained fields. Packed record structures are typically chosen for records intended to be written to disk, or sent across a network.

For base data types, the alignment requirements are an intrinsic property of the concrete type. It is determined by the implementation of the type. On the other hand, alignment of constructed types (nested records, field overlays, arrays), as well as the method of packing used, can be controlled a developer through the framework.

Fixed Length and Variable Length Records

A fixed length record can be described as a record in which the fields have a fixed or predetermined size, and therefore the entire record has a predetermined length. This allows an offset to be calculated for every field in the record, and a particular field will always be at the same offset in a byte array. A fixed length record can only contain fixed length fields and therefore only fixed length types. The type of a field determines whether it is a variable length or fixed length field. Moreover, arrays and overlays can only contain fixed length types.

A variable length record can be described as a record in which at least one of the fields does not have a fixed or predetermined size. The size of the field depends upon the contents of the byte array of the record. Therefore, the entire record's length can vary. A variable length record can also be thought of as a record that has a fixed or predetermined size, but the fields inside the record vary in length but never exceed the overall length of the record. For example, a 3270 screen record's size is 1920 bytes (24×80) long, but the fields on the screen vary in number and size. A variable length record can contain both fixed and variable length fields. This implies that a fixed length type can be used as either a fixed length or a variable length type.

In fixed length records, data can directly be read from or written into the record bytes because field sizes are fixed and an offset can be calculated and attached to each field. This allows the byte buffer to be always ready to be sent or written with no further data conversion. In a variable length record, as data is written into the record, the size of the record dynamically grows or shrinks depending upon the nature of data written into the record. Accordingly, writing directly into the record bytes would require continuously moving the record bytes around and recalculating field offsets as the size of the fields grow or shrink. Thus, in the framework of the present invention, a variable length record can only be a dynamic record because an offset to a particular field cannot be hardwired in a such a record. There is no generic way to "compile" a variable length record to provide direct access to a field.

The record type of a dynamic record determines whether it is a variable length or fixed length record.

Framework Specification

Runtime Constructs

The runtime portion of the framework is described in terms of four related groupings of constructs. The groupings reflect the semantic split between fixed length and variable length records, dynamic and custom records, as well as the specific type construction mechanisms supported by the framework. FIGS. 2 to 5 illustrate the key elements and their inheritance relationships (using OMT notation) and will be further described hereafter.

The base framework is fully defined in terms of interface semantics. Preferably, the specification is fully expressed in terms of Java interfaces thereby allowing the semantics of the framework components to be cleanly defined without a specific implementation. However, to those skilled in the art, it is readily apparent that the interfaces may be specified through other language constructs than Java. Further, components of the preferred implementation use other components in terms of their interfaces. In this way, any piece of an implementation can be replaced with an alternate implementation without breaking the remainder of the implementation.

Similarly, concrete and abstract class implementations of the framework may be defined in language constructs other than the Java language. Further, the data type implementations can be supplied for a variety of language data types including, for example, C, COBOL, PL1 or C++.

A preferred implementation of the framework interfaces is described below, including a description of the supported functions.

Records

Figure 2:
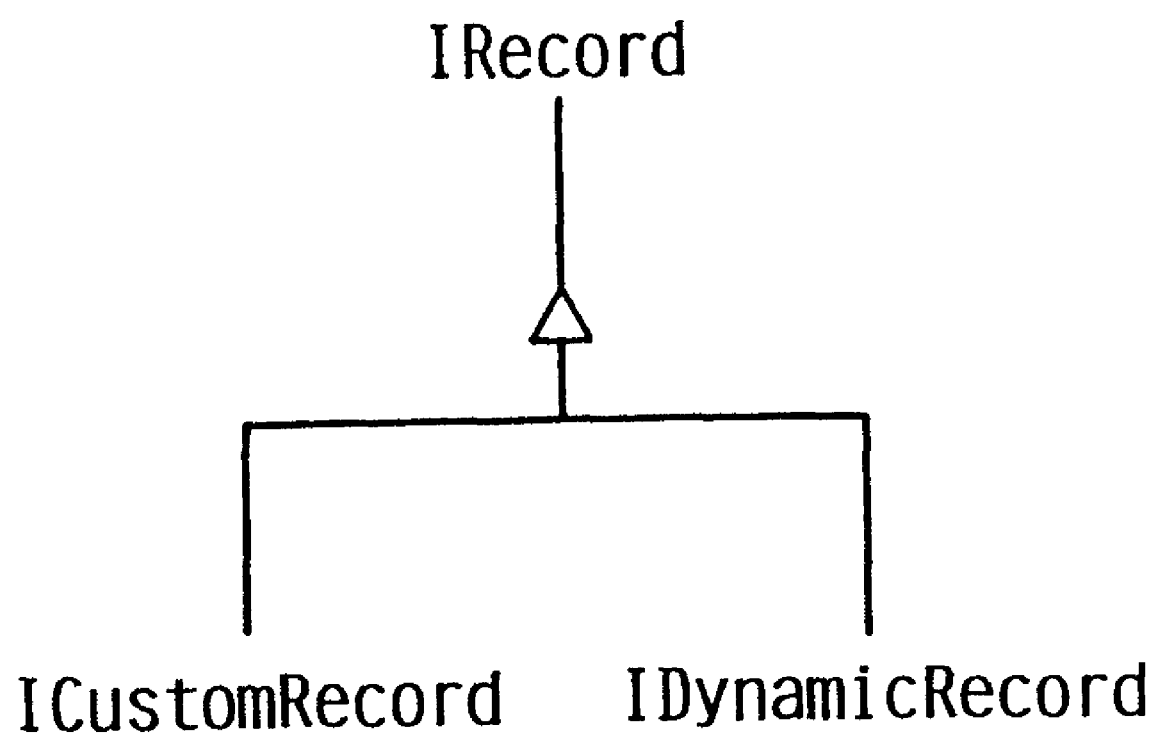
FIG. 2 is a chart illustrating the hierarchy of IRecord according to the present invention.

Referring to FIG. 2, the IRecord hierarchy defines the base behavior of all records. IRecord itself abstracts the base behavior of all records in a way usable in any usage context having the notion of a record. This includes associating a record descriptor (record type) with some data bytes (the record bytes) and describing the attributes or environment that originated the "bytes" in terms of its data encoding characteristics (e.g. endianess, codepage, floating point representation). The environment or attributes of the bytes are abstracted by the interface IRecordAttributes (not shown). IRecord itself does not supply any accessor functions to the record data elements. Instead each derived kind of an IRecord has its own element access "style".

IdynamicRecord, which inherits from IRecord, introduces field accessors that make use of the dynamic record descriptors. The accessors refer to specific record fields in terms of an identifier of the corresponding field descriptors. Preferably, specific accessors are defined for each of the base Java data types (char, boolean, byte, short, int, long, float, double), String, and Object. In the abstract, any referenced field can be retrieved or set as a base Java type, String or Object. However, the concrete type implementations associated with the referenced field in practice determine which of the accessors calls actually succeed and which throw an exception. Accessor variations are also defined for handling of nested fields (take composite name) and array elements (take element index).

ICustomRecord, which inherits from IRecord, does not define any field accessors. Rather, the developer provides the accessors in the concrete implementation of the custom record in a way most suitable to the using application (e.g. int getPersonAge() rather than int getInt( )).

Record Types

Figure 3:
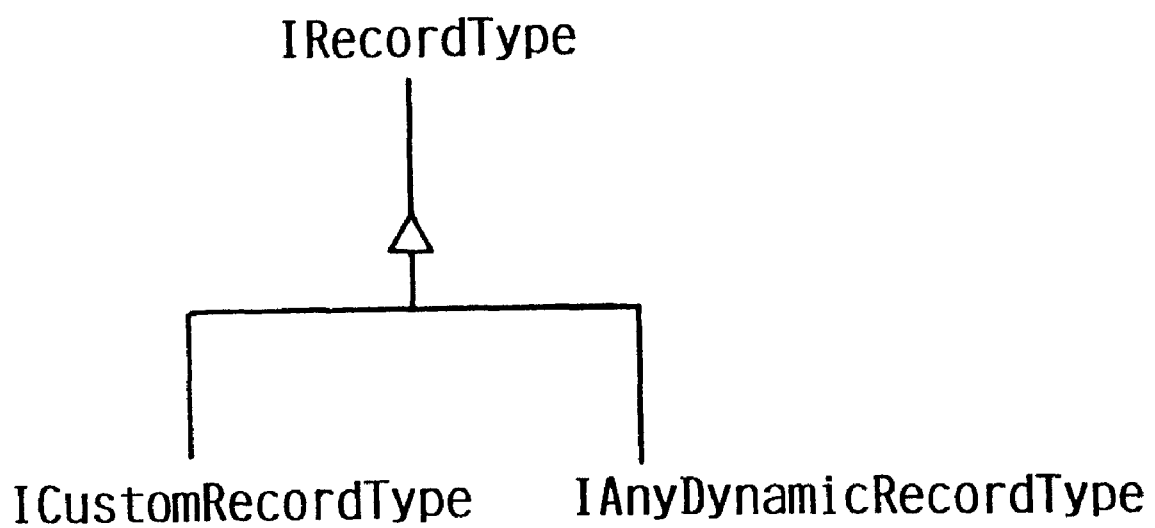
FIG. 3 is a chart illustrating the hierarchy of IRecordType according to the present invention.

Referring to FIG. 3, the IRecordType hierarchy defines the base behavior of all record descriptors (record types). IRecordType itself abstracts the base behavior of all record types in a way usable in any usage context having the notion of a record type. In the abstract, all record types provide a "factory" capability for creating new records of its type.

Figure 4:
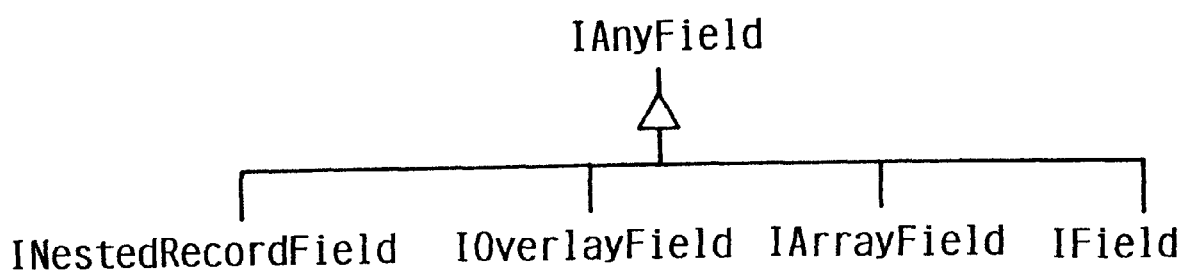
FIG. 4 is a chart illustrating the hierarchy of IAnyField according to the present invention.
Figure 5:
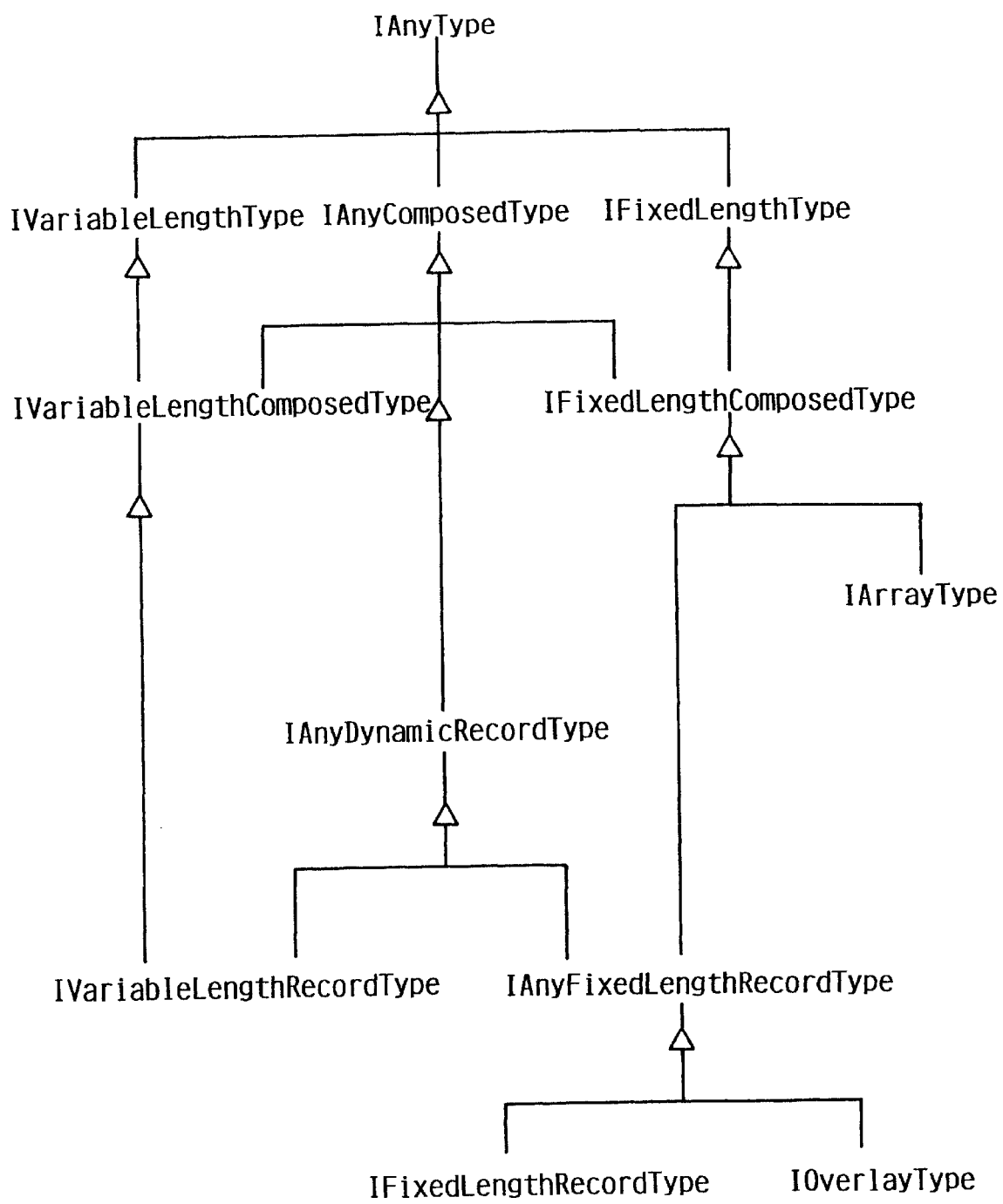
FIG. 5 is a chart illustrating the hierarchy of IAnyType according to the present invention.

IAnyDynamicRecordType, which inherits from IRecordType, defines the behavior for a dynamic collection of explicit field descriptors. This includes the ability to add, insert, delete, and retrieve field descriptors, and to iterate over the field descriptors through an enumerator. Referring to FIG. 4, the multiple inheritance of IAnyDynamicRecordType with the IAnyType hierarchy should be noted. This relationship is provided in support of nested records.

Like the IAnyDynanicRecordType, ICustomRecordType, which inherits from IRecordType, performs the role of a record factory. However, the equivalent function of the dynamic record type's descriptors is "compiled" directly into the custom field accessor method bodies supplied on the corresponding custom record. In addition, a set of accessors (designated as Object) is defined for custom record types in support of nested custom records.

Fields

Referring to FIG. 4, the IAnyField hierarchy defines the base behavior of all dynamic field descriptors. Fields are only used with dynamic record types; they are not used with custom records. In the abstract, all fields are a combination of an identifier (field name), the underlying field type, and a field relative offset into the record bytes (relative to its nesting structure). Fields also support the concept of an initial and constant value for the field. In this context, the constant value is a certain value attributed to the field, although the actual value of the field may be variable, and which is primarily used for checking against the current value of the field.

Fields also define accessors to their data elements. The accessor style is similar to that defined for records, except that the field name is replaced with a record reference (in order to get to record bytes and attribute description) and the absolute offset (in terms of record bytes) of the nesting structure containing the field.

Field variations, which all inherit from IAnyField, are defined for "simple" fields (IField), nested records (INestedRecordField), array fields (IArrayField) and overlays (IOverlayField). Each reflects the varying semantics of its underlying type as described above.

Types

The most interesting hierarchy is the type hierarchy. It can be split into three functional towers. On the left side of the type hierarchy are interfaces that deal with variable length types—the tower headed by IVariableLengthType. The middle of the type hierarchy has interfaces that are common to all types—the tower headed by IAnyComposedType. And, the right side of the type hierarchy has interfaces that deal with fixed length types—the tower headed by IfixedLengthType.

The IAnyType hierarchy defines the base behavior of all type implementations. This is the point within the framework that handles the actual access to record bytes and any required conversions. Types are used with both dynamic and custom records—in the first case being associated with fields and in the second case being directly referenced from custom accessor methods. Types supply the "ultimate" accessor to the bytes. Each type implementation must provide a pair of static conversion methods (from/to), and one or more pairs of accessor methods. The static methods perform the actual data conversion. They are used as part of the accessor method implementation in both dynamic and custom records.

The framework tries to minimize the amount of data conversion required—the "lazy fetch" mechanism. Consequently, data is only converted between record bytes and their framework, preferably Java, representation when the corresponding field is accessed. This applies equally to simple fields, fields contained in nested record structures, as well as access to individual array elements.

The IAnyType interface really describes a variable length type, as a fixed length type is an extension of a variable length type. Preferably, the framework defines a set of accessors methods to retrieve Java base types from an implemented type. For a fixed length type (IFixedLengthType), these accessors are based upon a fixed offset or fixed length type description. As discussed above with respect to fixed length records, data can be directly read from or written into the record bytes by such accessors and accordingly "lazy fetch" is easily implemented.

In order to effectively implement "lazy fetch" for a variable length type (IVariableLengthType), all reads and writes of a variable length record are done into a cache at the field level. Thus, before reading a field from a record, the byte array must be "unpacked" into a field cache of the record. Performing data conversion on the values is not necessary, "unpacking" here involves breaking up the byte array into pieces which represent each field. Before sending or writing the byte array, it needs to be "packed" back together (i.e. all the field pieces are put back into one contiguous byte array). With the variable length data being in a cache, each read/write does not involve moving around the bytes of a contiguous byte array. This also implies that buffer management is not done by the user, as the byte array representing the record could grow or shrink depending upon the data written into the record. The field cache data, however, always remains converted and ready for "packing" such that no further data conversion is required before sending or writing.

In order to facilitate caching of the field bytes, the accessor style does not use offset information, but rather passes in an array of bytes which represent the type in the record. Styles of preferred accessors written in Java are below wherein the XXX in the name of the methods are replaced with a Java native type (for example "int"), String, or Object.

Fixed Length Type Accessors

XXX getXXX (IRecord record, int fieldOffset)
void setXXX (IRecord record, int fieldOffset, XXX value)
Variable Length Type Accessors
XXX getXXX (IRecord record, byte[ ] byteArray)
byte[ ] setXXX (IRecord record, XXX value)

To further facilitate byte caching for variable length types, two methods (packageBytes( )/retrieveBytes( )) are defined on all types to assist in parsing the record's byte array. The retrieveBytes( ) method is used to "unpack" or chop up the record's byte array into a field cache. This method returns an array of bytes which represents the type's bytes in the record and the number of bytes it uses in the record's bytes. It only returns the bytes which represent the data, not any extra information which delimits fields in the record. For example, if there is a four byte length field preceding the data in the record bytes, only the data bytes would be returned, not the 4 byte length field. The length of the byte array returned will most likely not be the number of bytes used. In the example used, the number of bytes used would be four bytes greater than the length of the returned byte array. The packageBytes( ) method is the opposite of the retrieveBytes( ) method. It attaches any extra data to a type's bytes which is required for the type in the record. For example, a four byte length preceding the type's bytes. It returns an array of bytes which contains all of the information.

Type variations are defined for "simple" types (IFixedLengthType, IVariableLengthType) and the constructed types. "Simple" types include, for example, the base Java data types (char, byte, short, int, long, float, double). The constructed types include nested records (IFixedLengthRecordType, IVariableLengthRecordType used as a type), arrays (IArrayType) and overlays (IOverlayType). Each interface reflects the varying semantics of the corresponding type. Behavior common to the constructed types is abstracted in IAnyComposedType. This includes the handling of alignment and packing in constructed types. For example, constructed data types require packing interfaces while simple data types do not require packing interfaces.

Referring to FIG. 4, the IAnyType hierarchy is illustrated using OMT notation. IAnyType forms the top of the hierarchy. IVariableLengthType, IAnyComposedType and IFixedLengthType all inherit from IAnyType. As discussed above, IVariableLengthType defines the interfaces for variable length types, IFixedLengthType defines the interfaces for fixed length types and IAnyComposedType defines interfaces common to all types, particularly interfaces for nested records. Moving down the hierarchy, IVariableLengthComposedType and IFixedLengthComposedType inherit from IVariableLengthType and IFixedLengthType respectively as well as from IAnyComposedType. In this way, there is a sharing of interfaces.

Continuing, IAnyDynamicRecordType inherits from IAnyComposedType. The multiple inheritance of IAnyDynamicRecordType with the IAnyType hierarchy is provided in support of nested records. Further, IVariableLengthRecordType and IAnyFixedLengthRecordType respectively inherit from IVariableLengthComposedType and IFixedLengthComposedType as well as IAnyDynamicRecordType. Finally, in the preferred embodiment, overlays and arrays require fixed length data types. Hence, IArrayType inherits only from IFixedLengthComposedType and IOverlayType inherits only from IAnyFixedLengthRecordType. IFixedLengthRecordType inherits from IAnyFixedLengthRecordType and provides interfaces for fixed length record types other than overlays.

Design Time Constructs

Although the primary intent of the framework is to supply a runtime implementation of record-oriented data handling, a set of builder-type tools could be provided in order to assist in construction of record oriented structures. The framework therefore needs to be able to provide design-time information in dealing with its base constructs within a builder tool. This is accomplished in the preferred framework by treating the base framework construction elements as Java beans. The framework does not mandate however the use or creation of Java beans for user records. Generation of specific user record (or message) beans using the facilities of the framework is considered to be within the domain of builder tools.

The framework defines design-time constructs for providing descriptive information about the concrete type implementation supplied by a developer outside of the framework. Descriptive information is needed on a specific type basis and for each set of "compatible" types. A "compatible" set of types usually corresponds to some common target system or programming language environment.

ITypeInfo defines the behavior of a specific type implementation. In a preferred embodiment, ITypeInfo extends java.beans.BeanInfo. It provides assistance to tools for tool-based creation of custom records (obtaining static type conversion arguments). For dynamic record types (used as types), their corresponding information class also allows tools to constrain usage of base types to specific typeset(s).

ITypeSetInfo allows several base types to be grouped into a "compatible" set and provides descriptive information about the type that can be used by a tool to properly identify the type to the user.

Framework Implementation

Dynamic Record Implementation

A set of preferred concrete and abstract class implementations are provided for the dynamic record support defined by the framework. These are:

DynamicRecord (implements IdynamicRecord)
BasicRecordAttributes (implements IrecordAttributes)
FixedLengthRecordType (implements IfixedLengthRecordType)
VariableLengthRecordType (implements IvariableLengthRecordType)
Field (implements Ifield)
ArrayField (implements IarrayField)
OverlayField (implements IoverlayField)
NestedRecordField (implements InestedRecordField)
RowMajorArrayType (implements IarrayType)
ColumnMajorArrayType (implements IarrayType)
OverlayType (implements IoverlayType)

Figure 6:
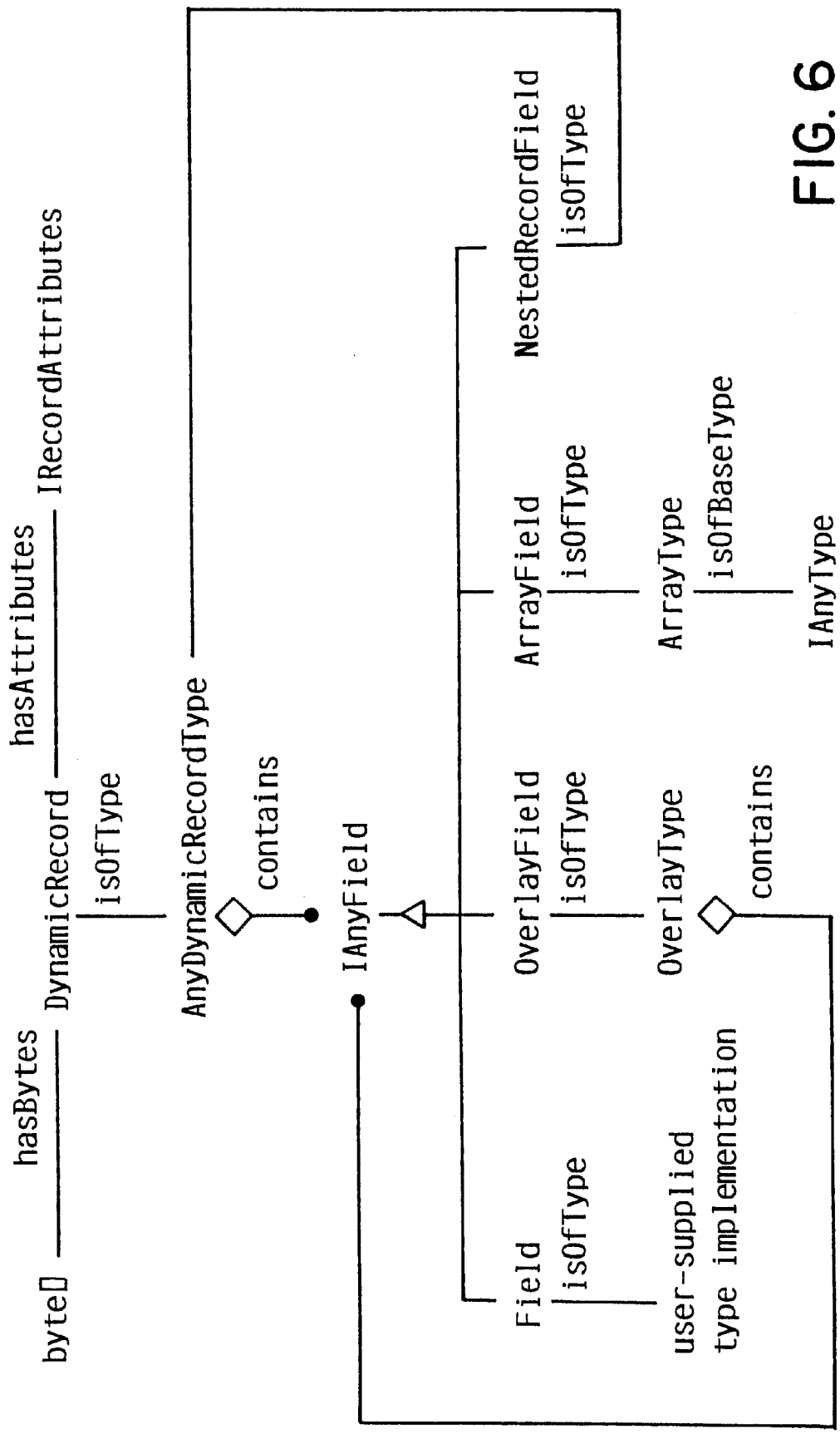
FIG. 6 is a chart illustrating the hierarchy of DynamicRecord according to the present invention.

The overall structure of a preferred dynamic record implementation is illustrated (using OMT notation) in FIG. 6.

DynamicRecord aggregates the actual record bytes (byte[ ] in FIG. 6), an instance of a dynamic record type and various information describing the system environment from which the record bytes originated. The using application has the ability to indicate the record starting offset within the bytes, if not 0. The record starting offset is not factored into packing and alignment calculations for the record type; it simply offsets the start of the record bytes. There is an alignment offset, however, which is factored into packing and alignment calculations for the record type. It is the application's responsibility to ensure the referenced bytes actually contain a full record.

BasicRecordAttributes provides a common set of attributes which apply to most records. It provides the ability to describe the code page, endian, and floating point representation of the record bytes. In FIG. 6, BasicRecordAttributes is not shown but corresponds to IRecordAttributes therein. IRecordAttributes is shown in FIG. 6 because a user could equally supply a different implementation of the attributes of a dynamic record in accordance with the IRecordAttributes interface; BasicRecordAttributes is simply a preferred common set of attributes.

AnyDynamicRecordType is an implementation of a collection of fields. The record type is constructed by adding the individual field descriptors (instances of the field classes). The classes FixedLengthRecordType and VariableLengthRecordType (not shown in FIG. 6) are abstract implementations of fixed and variable length record types. Application developers can also use AnyDynamicRecordType to construct user-defined record types. In this case, an application class can extend FixedLengthRecordType or VariableLengthRecordType and provide its definition, by adding field method calls, as part of the application class constructor. The supplied implementation of the accessors expects and returns (Object)IDynamicRecord. In both cases (get and set accessors) the implementation copies the record bytes into a new record structure (get) or from the supplied record (set).

Fields within dynamic record types can be accessed either directly by name or sequentially. For sequential access, a field enumerator is provided as part of a preferred implementation.

Four concrete field implementations are provided, all inheriting from IAnyField. In all cases the field implementation combines the name of the field, with the field type and relative offset in the record bytes.

Field is an implementation for use with simple types that are user-supplied implementations of IFixedLengthType or IVariableLengthType. OverlayField implements a "union" of fields and is simply a grouping construct (see FIG. 6). The implementation causes the maximum allocation based on the size of the union elements i.e. the union size is the size of its largest element. The actual data fields mast be accessed through the union element fields. ArrayField is a preferred implementation of an array field. It supports array style accessors to individual array elements, as well as the standard accessors applying to the array as a whole. NestedRecordField is a field implementation for creating nested record structures. AnyDynamicRecordType is used to indicate the type for a nested record field (see FIG. 6). Nested records can be accessed in their entirety. If required, developers can define additional field varieties by deriving the supplied concrete classes, or directly implementing the framework interfaces.

Type is an implementation of the simple types and constructed types. Type acts as the actual accessor of record data, performing any necessary data conversions. The preferred implementation supplies the C language data types (all implementing IFixedLengthType). Additional type implementations can and should be supplied by a developer in order to handle access to application data within a specific target environment such as, for example, COBOL, PL1, or C++. A preferred implementation of the constructed types is also supplied with the preferred framework.

An OverlayType implements a union group. The preferred implementation does not support access to the union as a whole—neither as a base Java type, nor an Object. The union data must always be accessed through one of the specific element fields within the union.

RowMajorArrayType is the preferred "row major" implementation of an array which provides default alignment and "row major" packaging of the array elements. The implementation supports methods for accessing the entire array as an Object, and methods for accessing the individual array elements. In the preferred embodiment, individual array elements are passed and returned either as their base underlying type cast to Object, or as the corresponding Java base type (with conversion). The entire array is passed and returned as the appropriate type array of correct dimension cast as an Object. For example, using a two-dimensional array of Widget, the individual elements are passed and returned as (Object)Widget, and the entire array is passed and returned as (Object)Widget[ ][ ].

The preferred implementation only supports "fully formed" arrays. That is, the arrays are assumed to be fully allocated. When passing an entire array as argument cast as Object, the array is expected to contain all of the possible array elements as dictated by the array allocation bounds.

ColumnMajorArrayType is a second preferred implementation of an array type. It is identical in all aspects to RowMajorArrayType, except that it implements a "column major" element layout.

Optionally, a user could provide additional array implementations (including their own storage algorithms) by extending RowMajorArrayType, or by implementing an IArrayType. In FIG. 6, RowMajorArrayType and ColumnMajorArrayType are not shown but correspond to ArrayType. ArrayType is shown in FIG. 6 because a user could equally supply a different array in accordance with the IArrayType interface; RowMajorArrayType and ColumnMajorArrayType are simply preferred array implementations.

Field Alignment and Packing Implementation

The preferred implementation of the framework supports a default packing algorithm that takes into account the packing and alignment hints in calculating field offsets and required padding. In the general case, fields cannot be properly aligned as they are being added. Compiler algorithms for languages that created most of today's record structures often consider whole structures when deciding on alignment and packing. The preferred record Java implementation mirrors this behavior. The user must explicitly pack a record type (via its pack( ) method) after it has been completely constructed, and before it is used to access record data.

The preferred implementation of the dynamic record classes calculates the correct field offsets for fixed length record types. This is done through an explicit call to the pack( ) method after the record type has been completely constructed. The supplied algorithm uses the alignment and packing "hints" supplied on the type implementations to do this.

The base packing algorithm follows that of the well-known packing algorithm of the C language. It interprets the alignment hint as a byte-multiple boundary to be used for the type. Packing hints can be used to force alternate alignment. Hints are interpreted as byte-multiple boundaries to be used to align types that have larger "natural" alignment boundaries. For example, packing hint of 1 forces single-byte alignment for all types. Packing hint of 4 will force double to 4-byte boundary (assuming 8-byte natural alignment) but will let a short align itself on a 2-byte boundary (assuming 2-byte natural alignment). A packing hint of 8 results in an unpacked structure ("naturally" aligned).

Custom Record Implementation

A set of preferred concrete class implementations is provided for the custom record support defined by the framework. These are:

CustomRecord (implements IcustomRecord)

BasicRecordAttributes (implements IrecordAttributes)

CustomRecordType (implements IcustomRecordType)

Figure 7:
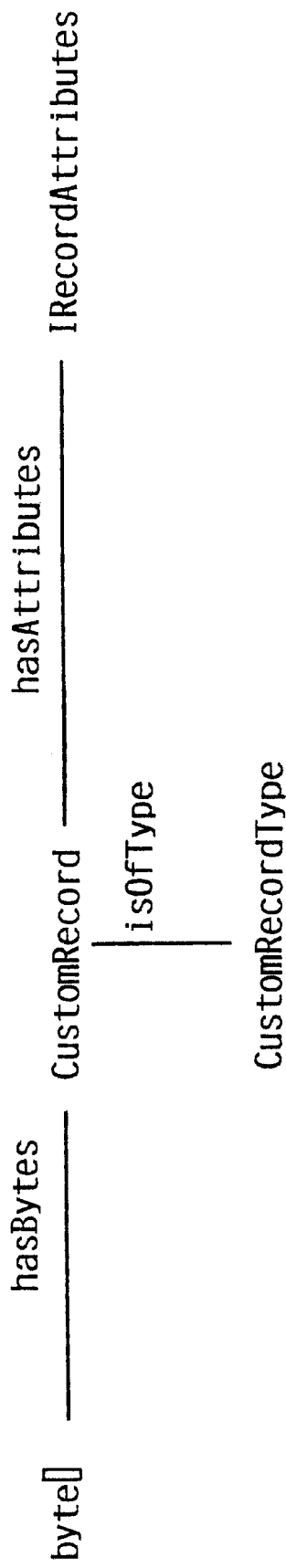
FIG. 7 is a chart illustrating the hierarchy of CustomRecord according to the present invention.

The overall structure of the custom record implementation is illustrated (using OMT notation) in FIG. 7.

The custom record classes do not use fields, dynamic record type structures, and do not define a separate set of type implementations. The simple and array type implementations are used by both sets of record implementations.

Referring to FIG. 7, CustomRecord is a convenience abstract class containing a preferred implementation of a custom record. This class must be extended by a specific custom record class, adding the appropriate accessor methods. Since a dynamic field description structure does not exist in custom records, the accessor method implementations "hardwire" the specific byte offset representing the field being accessed, and directly invoke the appropriate static conversion methods supplied with the corresponding type implementation. Using the static conversion methods eliminates the need for creating "throwaway" type objects.

BasicRecordAttributes provides a common set of attributes which apply to most records. It provides the ability to describe the code page, endian, and floating point representation of the record bytes. In FIG. 7, BasicRecordAttributes is not shown but corresponds to IRecordAttributes therein. IRecordAttributes is shown in FIG. 7 because a user could equally supply a different implementation of the attributes of a dynamic record in accordance with the IRecordAttributes interface; BasicRecordAttributes is simply a preferred common set of attributes.

A common CustomRecordType class is provided as part of the implementation. It does not contain any field level information. Its purpose within the framework is to act as a factory for custom records and be able to return the size of a specific custom record.

Rather than requiring a separate custom record type class to be defined for each custom record, the preferred implementation makes use of a single custom record class. All derived custom record classes provide a static method getCustomRecordType( ) that returns a properly initialized CustomRecordType instance.

Design Support Implementation

The preferred implementation of the record framework supplies all the concrete construction classes in the form of Java beans. The beans are not required for runtime use of the framework or for proper functioning of any executing record application, but rather are intended for use by record builder tools. Developers providing alternate implementations of the framework classes should preferably supply them as beans. This includes optional "info" classes supplied by concrete type implementers. The BeanInfo for each extended implementation should define any new properties that are supplied as part of the alternate implementation.

In the preferred implementation, the framework allows a user to add base type implementations (e.g. adding a S/390 COBOL PIC type implementation) in a way recognizable by builder tools with appropriate constraints in terms of type selection and usage. Accordingly, a pair of convenience concrete classes is provided for the use by developers creating additional base type implementations. They supply the default behavior of ITypeInfo and ITypeSetInfo. Type developers may choose to derive the convenience classes, rather than directly implementing their corresponding interfaces. For example in a preferred embodiment, the type developer can provide extended BeanInfo classes for each new type, the extensions to base BeanInfo supplying type-level information required to properly manipulate individual types in the builder tool, and to assist in generation of custom records (optimized for access) from their dynamic counterparts. Additionally, new types can also be grouped into "compatible" sets by providing TypeSetInfo classes.

SimpleTypeInfo, which implements ITypeInfo and extends java.beans.SimpleBeanInfo, is a preferred implementation of a type information class. The type information class of the preferred implementation is simply an extended BeanInfo class. Consequently, the type information class for type Foo would be named FooBeanInfo. There is one type information class for each concrete type implementation.

SimpleTypeSetInfo, which implements ITypeSetInfo, is a preferred implementation of an information class describing a set of related types (for example, S/390 COBOL types). There can be several type set information classes supplied with any one set of concrete type implementations. The supplied set definitions may overlap in their content.

A further means for extending the framework is providing alternate implementations of the base record construction elements, such as fields, etc. In this case, the developer can provide the implementation in the form of a Java bean, describing all extended element properties. In this way, a builder tool can properly handle new implementations of the framework classes. The preferred implementation of the base framework for record access provides all its base elements as Java beans.

Builder Tools

Figure 8:
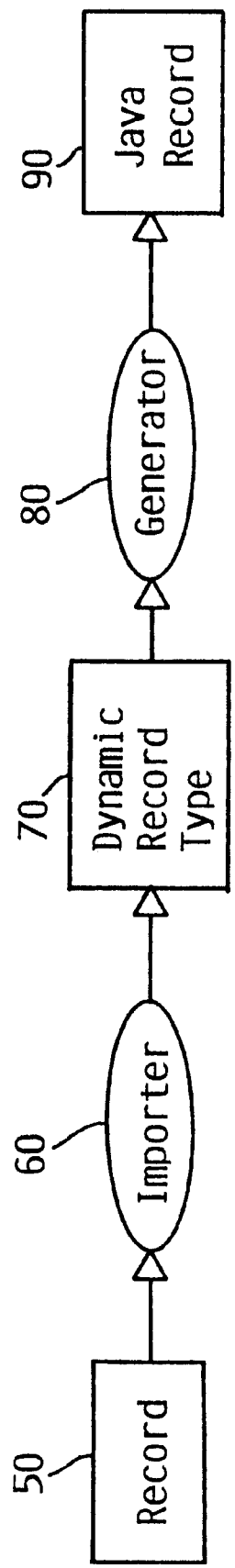
FIG. 8 is a diagram of structure of a basic record builder tool according to the present invention.

A set of builder-type tools could be provided for assisting in construction of record oriented structures. Such tools can include tools for presentation of record structures and other design tasks. One such basic record builder tool is schematically shown in FIG. 8 which can provide access to record-oriented data by providing for the deletion, addition, modification, insertion, and retrieval of data in a record. In accordance with the preferred implementation of the framework, it comprises an importer 50 written in the Java language that generates a dynamic record type 70 in accordance with an implementation of the framework of the present invention from a record 50 having C data types and a generator 80 written in Java that generates dynamic or custom Java records 90 based upon the dynamic record type 70. Optionally, the tool could be written in other languages and used with implementations of the framework of the present invention written in other languages. The tool may be one integrated tool, including the importer and generator, or separate tools for the importer and the generator.

In a preferred embodiment, a tool is provided to generate Java beans or Java classes which represent record data. The Java beans generated for a record contain a Java property for some or all of the data elements of the record it is meant to represent.

Further, the record data represented may exhibit certain language related characteristics. Consequently, the user may want to reflect the relevant language's characteristics (e.g. COBOL, PL1, C, C++, etc. data characteristics) in how the Java beans are generated and the way the user would want to interact with those beans. Effectively, the user can control the "scoping" aspects of the code generated.

For example, a record in COBOL, sampleRec, may be defined as follows:
01 sampleRec.
  02 num PIC 99999 DISPLAY.
  02 name PIC X(10).

```
02 physicalAttrs.
   03 height PIC 99999.
   03 weight PIC 99999.
   03 eyeColour PIC X(10).
```

The same record could be represented in the C programming language as follows:
```
struct sampleRec {
   int num;
   char name[10];
   struct physicalAttrs {
      int height;
      int weight;
      char eyeColour[10];
   }
}
```

In the case of the C structure, a user would have to access eyeColour by the means of an instruction that fully qualifies eyeColour e.g. physicalAttrs.eyeColour. The C structure is hierarchical. In the case of the COBOL structure, a user does not need to filly qualify the name and could access eyeColour directly. Thus, the COBOL structure is flat.

In a preferred embodiment, the tool allows Java code representing the record selectively to be generated with "FLAT" or "HIERARCHICAL" type of access. Based on the COBOL structure for sampleRec above, the Java record generated as "FLAT" is as follows:
```
public class patGen
   {
      public patGen( )
      { }
      public java.lang.String getEyeColour( ) {
      }
      public int getHeight( ) {
      }
      public java.lang.String getName( ) {
      }
      public int getNum( ) {
      }
      public int getWeight( ) {
      }
      public void setEyeColour(java.lang.String
         aEyeColour) {
      }
      public void setHeight(int aHeight) {
      }
      public void setName(java.lang.String aName) {
      }
      public void setNum(int aNum) {
      }
      public void setWeight(int aWeight) {
      }
   }
```

The tool generates a Java class comprising get and set methods for the fields of the record. Thus, the properties of the record are surfaced with no nesting considerations because the user deals with one Java class representing the record. Then, for example, calling setEyeColour( ) would cause the eye colour field within the underlying record to be set to the correct value. Data is transformed into the form required based on what the record represents. In this case, the Java string would be turned into the correct COBOL string, in the correct position in the underlying data. Fundamentally, the properties are surfaced with no nesting considerations as the user deals with one Java class.

If the user chose to generate a hierarchical record, the tool generates Java classes according to the hierarchical structure of the record, each Java class comprising get and set methods for the fields of the record. In a preferred embodiment, to limit the generation of the hierarchy of classes, arrays are excluded from determination from the hierarchy. For the above structure, the tool generates two Java classes—one for the outside record, and one for the subrecord, with the main (outside) record referencing the sub-record. Based on the COBOL structure for sampleRec above, the Java record generated in "HIERARCHICAL" form is as follows:
```
public class patGenHeir
{
   public patGenHeir( )
   { }
   public java.lang.String getName( ) {
   }
   public int getNum( ) {
   }
   public patGenHeir_physicalAttrs getPhysicalAttrs( ) {
   }
   public void setName(java.lang.String aName) {
   }
   public void setNum(int aNum) {
   }
   public void setPhysicalAttrs(patGenHeir_physicalAttrs
      aPhysicalAttrs) {
   }
}
public class patGenHeir_physicalAttrs
{
   public patGenHeir_physicalAttrs( )
   { }
   public java.lang.String getEyeColour( ) {
   }
   public int getHeight( ) {
   }
   public int getWeight( ) {
   }
   public void setEyeColour(java.lang.String aEyeColour) {
   }
   public void setHeight(int aHeight) {}
   public void setWeight(int aWeight) {
   }
}
```

In order to access the subrecord data (e.g. eyeColour), a getPhysicalAttrs instruction must be performed and the setEyeColour( ) method invoked on the patGenHeir_physicalAttrs object.

When a record contains an array of subrecords such as, for example, a nested record field, in the preferred embodiment, the access to the subrecords is always generated hierarchically because of usability concerns. Therefore, if the physicalAttrs definition in the above COBOL structure were modified to as follows:

```
02 physicalAttrs OCCURS 3 TIMES.
```
then the Java record for SampleRec would be as follows:
```
public class patGenHeir
{
   public patGenHeir( )
   public java.lang.String getName( ) {
   }
   public int getNum( ) {
   }
```

```
    public patGenHeir_physicalAttrs [ ] getPhysicalAttrs(
        ) {
    }
    public patGenHeir_physicalAttrs getPhysicalAttrs(int
        index){
    }
    public void setName(java.lang.String aName) {
    }
    public void setNum(int aNum) {
    }
    public void setPhysicalAttrs(patGenHeir_physicalAttrs [
        ] aPhysicalAttrs) {
    }
    public void setPhysicalAttrs(int index, patGenHeir_
        physicalAttrs aPhysicalAttrs)
    { }
    }
public class patGenHeir_physicalAttrs [ ]
{
    public patGenHeir_physicalAttrs( )
    { }
    public java.lang.String getEyeColour( ) {
    }
    public int getHeight( ) {
    }
    public int getWeight( ) {
    }
    public void setEyeColour(java.lang.String aEyeColour) {
    }
    public void setHeight(int aHeight) {
    }
    public void setWeight(int aWeight) {
    }
}
```

The Java record above provides access to the entire array of subrecords or individual subrecords according to the variable index.

While a preferred embodiment of this invention has been described in relation to the Java language, this invention need not be solely implemented using the Java language. The framework and builder tools of the invention may equally be developed in other computer languages such as object oriented languages like C++.

The invention may be implemented as an article of manufacture comprising a computer usable medium having computer readable program code means therein for executing the method steps of the invention. Such an article of manufacture may include, but is not limited to, CD-ROMs, diskettes, tapes, hard drives, and computer RAM or ROM. Also, the invention may be implemented in a computer system A computer system may comprise a computer that includes a processor and a memory device and optionally, a storage device, a video display and/or an input device. Moreover, a computer system may comprise an interconnected network of computers. Computers may equally be in stand-alone form (such as the traditional desktop personal computer) or integrated into another apparatus (such a cellular telephone). While this invention has been described in relation to preferred embodiments, it will be understood by those skilled in the art that changes in the details of processes and structures may be made without departing from the spirit and scope of this invention. Many modifications and variations are possible in light of the above teaching. Thus, it should be understood that the above described embodiments have been provided by way of example rather than as a limitation and that the specification and drawing are, accordingly, to be regarded in an illustrative rather than a restrictive sense.

The embodiments of the invention in which an exclusive property or privilege is claimed are defined as follows:

1. A computer-implemented method for accessing record bytes from a record, said record having at least one field associated with the record bytes, comprising the steps of:
   (a) modeling the record by means of an implementation of a framework, wherein the framework comprises a record interface, a record type interface, a field interface and a type interface; and
   (b) accessing the record bytes through said implementation of the framework.

2. The computer-implemented method of claim 1, wherein the record interface associates a record type with the record bytes.

3. The computer-implemented method of claim 2, wherein the record interface further describes attributes of the record bytes in terms of data encoding characteristics.

4. The computer-implemented method of claim 2, wherein the record type interface provides a capability to define new records of the record type.

5. The computer-implemented method of claim 1, wherein the record interface comprises a dynamic record interface, said dynamic record interface providing an accessor to the field in accordance with an identifier of the field.

6. The computer-implemented method of claim 1, wherein the record interface comprises a custom record interface, said custom record interface providing a user-defined accessor to the record bytes.

7. The computer-implemented method of claim 1, wherein the record interface comprises a dynamic record interface, said dynamic record interface providing an accessor to the field in accordance with an identifier of the field, and further comprises a custom record interface, said custom record interface providing a user-defined accessor to the record bytes and wherein a user can selectively choose implementation of the dynamic record interface or the custom record interface.

8. The computer-implemented method of claim 1, wherein the record type interface collects a field descriptor of the field in the record.

9. The computer-implemented method of claim 8, wherein the record type interface further comprises a dynamic record type interface, said dynamic record type interface providing an ability to add, insert, delete, or retrieve field descriptors.

10. The computer-implemented method of claim 9, wherein the dynamic record type interface provides an ability to iterate over field descriptors of the record through an enumerator.

11. The computer-implemented method of claim 1, wherein the field interface associates a field descriptor with the field of the record, said field descriptor comprising a field name, a data type, and a field relative offset into the record bytes.

12. The computer-implemented method of claim 1, wherein the field interface provides an accessor to the field in accordance with an absolute offset with respect to the record in terms of record bytes.

13. The computer-implemented method of claim 1, wherein the field interface comprises a nested record field interface, said nested record interface defining a structure of records within the record.

14. The computer-implemented method of claim 1, wherein the field interface comprises an overlay field interface, said overlay field interface defining a union of fields anchored to a same offset within the record bytes.

15. The computer-implemented method of claim 1, wherein the type interface defines a data type of the field.

16. The computer-implemented method of claim 1, wherein the type interface comprises at least one of:
   a static conversion method; and
   a fixed length type interface, said fixed length type interface providing an accessor to the record bytes in accordance with a fixed offset of the field.

17. The computer-implemented method of claim 1, wherein the type interface comprises a variable length type interface, said variable length type interface providing an accessor to:
   (a) read the record bytes of the record and unpack the record bytes into segments corresponding to the fields of the record;
   (b) store said segments in a field level cache for access; and
   (c) pack the segments back into a contiguous array of record bytes of the record and write the contiguous array of record bytes of the record.

18. The computer-implemented method of claim 17, wherein providing an accessor to unpack the record bytes further comprises providing a method that returns record data of the field without the record data that delimits the field in the record.

19. The computer-implemented method of claim 17, wherein providing an accessor to pack the record bytes comprises providing a method that attaches delimiting record data to the record data of a field according to the data type of the field.

20. The computer-implemented method of claim 1, wherein the step of accessing the record bytes comprises converting the record bytes of the field into a framework representation only when said field in the record is accessed.

21. The computer-implemented method of claim 1, wherein said method steps are implemented by means of an object-oriented computer programming language.

22. The computer-implemented method of claim 21, wherein the record has specific computer programming language record data characteristics wherein the computer language of said specific computer programming language record data characteristics is a non-object-oriented computer programming language.

23. The computer-implemented method of claim 1, wherein the step of accessing the record bytes comprises optionally providing access to the record data in hierarchical form or flat form.

24. The computer-implemented method of claim 23, wherein providing access to the record data in hierarchical form comprises generating classes according to a hierarchical field structure of the record, each class comprising an accessor for the fields in the structure.

25. The computer-implemented method of claim 23, wherein providing access to the record data in flat form comprises generating a single class for a field structure of the record, said class comprising an accessor for the fields in the structure.

26. The computer-implemented method of claim 23, wherein providing access to the record data, the record containing an array of subrecords, comprises generating a class for a subrecord, said class comprising an accessor for the fields of the subrecord.

27. An object-oriented framework resident in a memory of a computer system that supports an object-oriented programming environment, wherein the framework provides access to record bytes from a record in said computer system, said record having a field associated with the record bytes, and includes:
   a record class, said record class associating a record type with the record bytes;
   a record type class, said record type class collecting a field descriptor of the field in the record;
   a field class, said field class associating the field descriptor with the field of the record, said field descriptor comprising a field identifier, a data type, and a field relative offset into the record bytes; and
   a type class, said type class defining the data type of the field.

28. The framework of claim 27, wherein the record class further describes attributes of the record bytes in terms of data encoding characteristics.

29. The framework of claim 27, wherein the record class comprises a dynamic record class, said dynamic record class providing an accessor to the field in accordance with an identifier of the field.

30. The framework of claim 27, wherein the record class comprises a custom record class, said custom record class providing a user-defined accessor to the record bytes.

31. The framework of claim 27, wherein the record class comprises a dynamic record class, said dynamic record class providing an accessor to the field in accordance with an identifier of the field, and further comprises a custom record class, said custom record class providing a user-defined accessor to the record bytes and wherein the user can selectively choose implementation of the dynamic record class or the custom record class.

32. The framework of claim 27, wherein the record type class comprises a dynamic record type class, said dynamic record type class providing an ability to add, insert, delete, or retrieve field descriptors.

33. The framework of claim 32, wherein the dynamic record type class provides an ability to iterate over field descriptors of the record through an enumerator.

34. The framework of claim 27, wherein the record type class provides a capability to define new records of the record type.

35. The framework of claim 27, wherein the field class provides an accessor to the field in accordance with an absolute offset with respect to the record in terms of record bytes.

36. The framework of claim 27, wherein the field class comprises a nested record field class, said nested record class defining a structure of records within the record.

37. The framework of claim 27, wherein the field class comprises an overlay field class, said overlay field class defining a union of fields anchored to a same offset within the record bytes.

38. The framework of claim 27, wherein the data type may be configurable and supplied by the user.

39. The framework of claim 27, wherein the type class comprises a static conversion method and an accessor to the record bytes of the field.

40. The framework of claim 27, wherein the type class comprises a fixed length type class, said fixed length type class providing an accessor to the record bytes in accordance with a fixed offset of the field.

41. The framework of claim 40, wherein providing an accessor to pack the record bytes further comprises providing a method that attaches delimiting record data to the record data of a field according to the data type of the field.

42. The framework of claim 27, wherein the type class comprises a variable length type class, said variable length type class providing an accessor to:

(a) read the record bytes of the record and unpack the record bytes into segments corresponding to the fields of the record;

(b) store said segments in a field level cache for access; and (c) pack the segments back into a contiguous array of record bytes of the record and write the contiguous array of record bytes of the record.

43. The framework of claim 42, wherein providing an accessor to unpack the record bytes further comprises providing a method that returns record data of the field without the record data that delimits the field in the record.

44. The framework of claim 27, wherein the classes may be extended by a user to define additional classes.

45. The framework of claim 27, wherein said classes are defined in terms of an object-oriented programming language.

46. The framework of claim 45, wherein the record has specific computer programming language record data characteristics and wherein the computer language of said specific computer programming language record data characteristics is a non-object-oriented programming language.

47. The framework of claim 27, wherein the record has a record identifier, said record identifier comprising the record bytes and record attributes of the record.

48. A method of operating a computer system that provides an object-oriented programming environment, having one or more records, and communicating with one or more users executing object-oriented application programs for access to record bytes of a record, the method comprising the steps of:

(a) modeling the record in accordance with an object-oriented framework comprising:

(i) a record class, said record class associating a record type with the record bytes;

(ii) a record type class, said record type class collecting a field descriptor of a field in the record and associated with the record bytes;

(iii) a field class, said field class associating the field descriptor with the field of the record, said field descriptor comprising a field identifier, a data type, and a field relative offset into the record bytes; and (iv) a type class, said type class defining the data type of the field; and (b) accessing the record bytes through said framework.

49. The method of claim 48, wherein said framework is defined in terms of an object-oriented programming language.

50. The method of claim 48, wherein the record class comprises a dynamic record class, said dynamic record class providing an accessor to the field in accordance with an identifier of the field.

51. The method of claim 48, wherein the record class comprises a custom record class, said custom record class providing a user-defined accessor to the record bytes.

52. The method of claim 48, wherein the record class comprises a dynamic record class, said dynamic record class providing an accessor to the field in accordance with an identifier of the field, and further comprises a custom record class, said custom record class providing a user-defined accessor to the record bytes and wherein the user can selectively choose implementation of the dynamic record class or the custom record class.

53. An article of manufacture containing a program which, when executed, performs an operation for accessing record bytes from a record, the record having at least one field associated with the record bytes, the operation comprising:

modeling the record by means of an implementation of a framework, wherein the framework comprises a record interface, a record type interface, a field interface and a type interface; whereby the record bytes are accessible to an application through the implementation of the framework.

54. The article of manufacture of claim 53, wherein the record interface associates a record type with the record bytes.

55. The article of manufacture of claim 54, wherein the record interface further describes attributes of the record bytes in terms of data encoding characteristics.

56. The article of manufacture of claim 53, wherein the record interface comprises a dynamic record interface, said dynamic record interface providing an accessor to the field in accordance with an identifier of the field.

57. The article of manufacture of claim 53, wherein the record interface comprises a custom record interface, said custom record interface providing a user-defined accessor to the record bytes.

58. The article of manufacture of claim 53, wherein the record interface comprises a dynamic record interface, said dynamic record interface providing an accessor to the field in accordance with an identifier of the field, and further comprises a custom record interface, said custom record interface providing a user-defined accessor to the record bytes and wherein a user can selectively choose implementation of the dynamic record interface or the custom record interface.

\* \* \* \* \*